be applied to the distillate which comprises a mixture

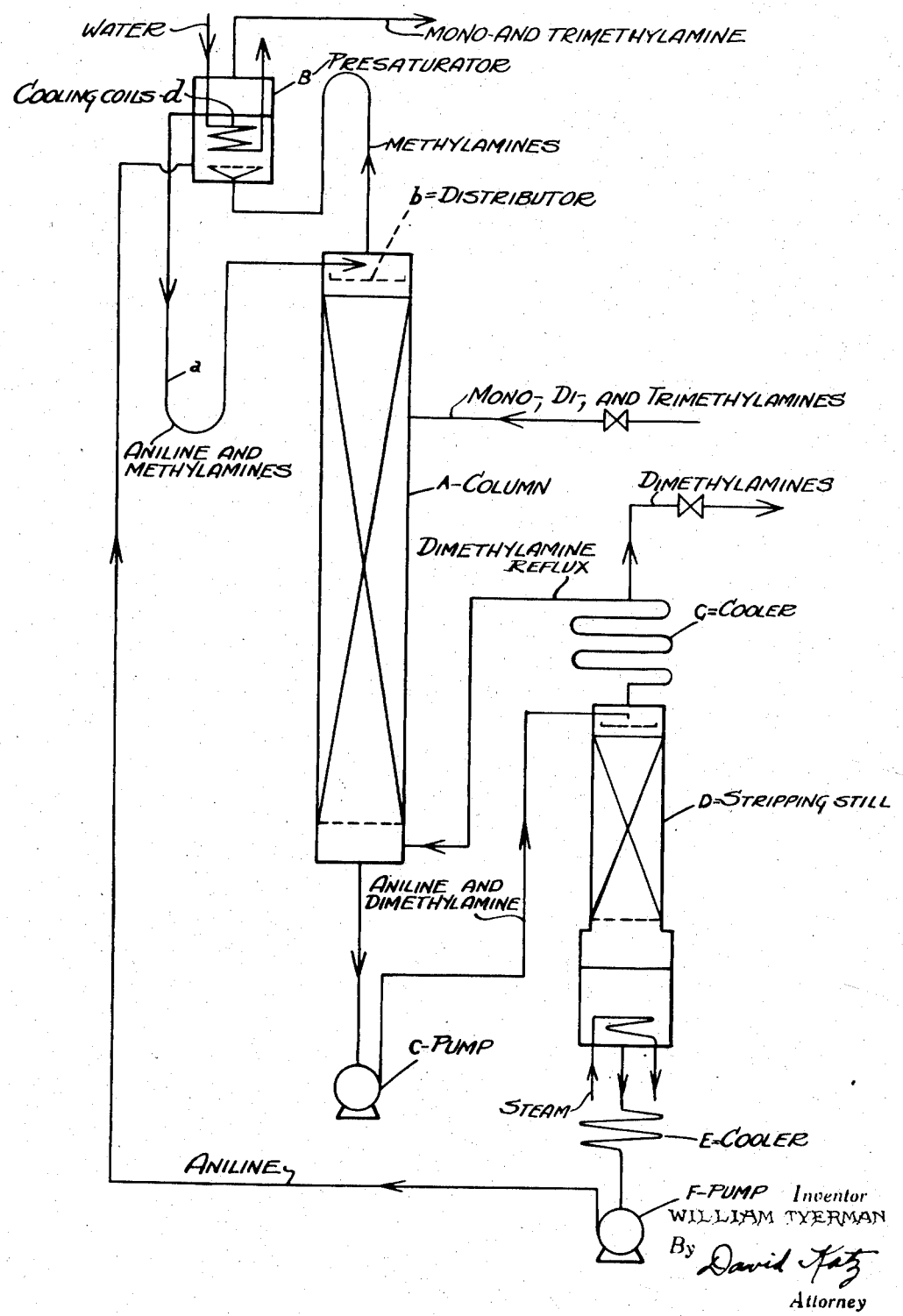

UNITED STATES PATENT OFFICE 2,570,291

EXTRACTIVE DISTILLATION OF METHYLAMINES

William Tyerman, Norton-on-Tees, England, assignor to Imperial Chemical Industries Limited, a corporation of Great Britain Application December 3, 1947, Serial No. 789,545
In Great Britain December 4, 1946

7 Claims. (Cl. 202—39.5)

This invention relates to amines.

According to the invention the methylamines are separated from their mixtures with one another and/or ammonia by continuous extractive distillation with liquid aniline, preferably at atmospheric pressure.

The term "selective absorption" is defined and described in applicant's copending U. S. application Serial No. 788,081, filed on November 25, 1947.

By "extractive distillation" in this specification is meant a process of selective absorption which is conducted in a column and is characterised by the features that the mixture to be treated is fed to the column at an intermediate point in the column, the extracting liquid is fed at a point above this, preferably at the top of the column, the vapour is taken off from the top of the column and at least some of the more soluble substance or substances absorbed in the liquid is desorbed from the liquid at the bottom of the column or outside the column, and is again brought in contact with the extracting liquid at, or in the neighbourhood of, the bottom of the column. This may be achieved, for example, by employing a boiler at the bottom of the column, and returning said substance or substances to the column as vapour, or by removing the extracting liquid from the bottom of the column, stripping from it the more soluble substance or substances in a separate still, and returning the desired proportion of said substance or substances to the bottom of the column as reflux. The proportion of the more soluble substance or substances returned as reflux will depend on the purity desired in the product, and on the relative solubilities of the individuals to be separated. Thus, where high purity is desired and/or the difference in solubility of the substances in the extracting liquid is small a high proportion of desorbed vapour will be returned as reflux. In practice the proportion to be absorbed as reflux can be readily determined by those skilled in the art.

The mixture may be fed to the column as vapour or liquid, in which last case vaporisation takes place within the column.

The process of the invention is of particular value in relation to the separation of the methylamines from the reaction product obtained by the catalytic vapour phase amination of methanol, which largely comprises ammonia, a mixture of methylamines, water and methanol. This mixture is given a preliminary treatment with caustic soda and the ammonia and amines are separated from the other materials by distillation.

The process of the present invention may be applied to the distillate which comprises a mixture of ammonia and amines.

The solubilities in aniline of the three methylamines, and of ammonia at various temperatures under atmospheric pressure are shown in the table in which the solubility is expressed in terms of cubic metres of gas, measured at atmospheric pressure and 20° C., per cu. metre of liquid aniline.

Table

| Compound | Solubility | | | | |
|---|---|---|---|---|---|
| | 20° C. | 30° C. | 40° C. | 50° C. | 60° C. |
| Ammonia | 40 | 34 | 27 | 20 | 14 |
| Momomethylamine | 271 | 181 | 122 | 85 | 58 |
| Dimethylamine | 520 | 285 | 183 | 128 | 88 |
| Trimethylamine | 300 | 161 | 98 | 57 | 37 |

It is evident that within the range of temperatures shown and at atmospheric pressure dimethylamine is the most soluble of the four compounds, and ammonia the least soluble.

We have found that at atmospheric pressure dimethylamine and ammonia can be most efficiently separated from each other or from the other methylamines or from mixtures of methylamines and ammonia by extractive distillation with aniline at temperatures between 8° C., and 60° C., and preferably between 10° C. and 40° C. It is undesirable to operate above 40° C. since the difference in solubility is less and this adversely affects the separation, and also because the absolute solubility decreases to a degree necessitating a much larger circulation of aniline, with consequent increase in the size of plant required. As mentioned above, the process can be operated at temperatures as low as 8° C. but it is undesirable to operate too near the boiling point of dimethylamine (6.9° C.), as in this region small changes in temperature have such a large effect on the solubility of dimethylamine in aniline that steady operation of the column would be difficult.

The process may be directed to the separation of substantially pure dimethylamine, in which case some dimethylamine will be taken off in the vapour from the top of the still, or it may be directed to the separation of one of, or a mixture of, the other methylamines substantially free from dimethylamine by leaving at least some of the other amine or amines in the extracting liquid leaving the column. Both features are to be considered as falling within the scope of the invention.

The process of the invention can also be employed, after removal of dimethylamine and ammonia, for the separation of trimethylamine from monomethylamine or of monomethylamine from trimethylamine at temperatures of 25–60° C. at atmospheric pressure, the trimethylamine being taken off as vapour.

The process of the invention is preferably conducted at atmospheric pressure, but may also be conducted at pressures greater or less than atmospheric, if desired. When superatmospheric pressure is employed a suitable range of pressure is up to 20 atmospheres gauge.

The extractive distillation may be carried out employing columns of known type, for example packed, sieveplate or bubble cap columns. Preferably the mixture of ammonia and methylamines, or of methylamines, is introduced at an intermediate point in the column, most conveniently in vapour form. It is preferred to include in the system a pre-saturator of the type described in co-pending British application No. 35879/46 applied for by W. Tyerman and F. Wrigley on December 4, 1946 and issued as British Patent No. 630,884.

When dimethylamine is to be separated it will be obtained from the bottom of the column as a solution in aniline, from which it will be recovered by stripping; whereas when ammonia is to be separated from its mixtures with amines, it will be removed as vapour from the top of the column.

The invention will now be described with reference to its application to the separation of dimethylamine from a mixture with ammonia, monomethylamine and trimethylamine which is considered to be the most important application, but it will be evident to those skilled in the art that it can be applied with suitable modifications to the other separations already mentioned.

The arrangement of the apparatus is shown schematically in the accompanying drawings.

A mixture of gaseous amines obtained from the synthesis, i. e. the amination, unit was stripped of water and methanol in a fractionating column operating under pressure, and the stripped vapour was introduced to a 22' x 10" column A, which was packed with ¼" mild steel Raschig rings, at a point 8' from the top. The vapour leaving the top of the column was bubbled through aniline contained in the pre-saturator B, which contained cooling coils d through which water was circulated, the rate being adjusted so that the nearly saturated solution of amines in aniline leaving the pre-saturator was at about 20° C. The solution flowed via a luted pipe a into a distributor b, comprising a tray perforated with a number of ⅛" holes, situated at the top of the column.

From the bottom of the column a saturated solution of dimethylamine in aniline was fed by the pump C into the top of a stripping still D, comprising a steam heated boiler and a column packed with ¼" rings. In this the aniline was stripped of dimethylamine and was recirculated to the pre-saturator B through the cooler E and pump F. The gaseous dimethylamine stripped from the aniline was passed through a cooler G in which traces of aniline were condensed and this aniline was returned to the column D.

The gaseous dimethylamine leaving the cooler G was divided into two streams, of which one was taken to storage and the other was returned to the bottom of the column A as reflux. The gaseous dimethylamine taken to storage was substantially pure.

The remaining ammonia and methylamines leaving the top of the pre-saturator B were absorbed in water and recycled to the amination unit. It was found convenient to maintain the temperature in the pre-saturator B at about 20° C. and thereby to control the temperature at the bottom of the column A at about 35° C. The amount of gas to be returned as reflux to the bottom of the column A can be varied to suit the composition of the feed, the location of the feed point, and the efficiency of the column.

In an experimental run 18 parts by volume of a gaseous mixture of ammonia and methylamines containing 17.2% of dimethylamine was passed continuously to the column A which was operated at the aforesaid temperature and 0.12 part by volume of liquid aniline was fed to the column. 29.5 parts by volume of dimethylamine was obtained from the stripping column D, and of this 2.25 parts by volume of dimethylamine (98% pure) was taken to storage and the remainder was returned to the column A as reflux. 15.75 parts by volume of a mixed gas containing about 6% of dimethylamine was taken off from the top of the pre-saturator B.

I claim:

1. A process for the separation of dimethylamine from a mixture of the mono-, di-, and tri-forms of the methylamines which comprises subjecting the mixture to extractive distillation with aniline at a temperature within the range of 10° to 40° C. at atmospheric pressure, taking off as a vapor the mono- and tri- forms of methylamine, and obtaining dimethylamine as a solution in aniline.

2. A continuous process of extraction for the separation of substantially pure dimethylamine from a mixture of the mono-, di- and tri-forms of the methylamines which comprises the steps of contacting said mixture at a temperature between 20° and 40° C. at atmospheric pressure, with aniline, producing a raffinate containing as a vapor substantially mono- and trimethylamine, and taking off an extract containing substantially only pure dimethylamine as a solution in aniline.

3. A continuous process of extraction for the separation of substantially pure dimethylamine from a mixture of the mono-, di- and tri-forms of the methylamines which comprises the steps of contacting said mixture at a temperature between 20° and 40° C. at atmospheric pressure with aniline, producing a raffinate containing as a vapor substantially mono- and trimethylamine, and taking off an extract containing substantially only pure dimethylamine as a solution in aniline and stripping said extract of dimethylamine.

4. A process as set forth in claim 3 wherein a portion of said dimethylamine is returned for refluxing with said mixture, the remainder of said dimethylamine being drawn off as product.

5. A process as set forth in claim 3 wherein said stripped extract is returned to the system.

6. A continuous process of extraction for the separation of substantially pure dimethylamine from a mixture of the mono-, di-, and tri-forms of the methylamines which comprises introducing a stream of the said mixture into a zone for contact with a solution of methylamines in aniline, removing a mixture of methylamines as vapor from said zone, introducing said vapor into a second zone for contact with a stream of aniline, removing a mixture of monomethylamine and trimethylamine as vapor from the said second zone, removing a stream of aniline containing a mixture of methylamines having a higher concentration of dimethylamine than said first methylamine mixture from said second zone and introducing it into said first zone, withdrawing a solution of dimethylamine dissolved in aniline from said first zone, stripping dimethylamine from said solution, returning a portion of said stripped dimethylamine to said first zone, the remainder being drawn off as product, withdrawing aniline as a liquid from said stripping operation, and feeding said aniline as a stream to said second zone.

7. A continuous process of extraction for the separation of substantially pure dimethylamine from a mixture of the mono-, di-, and tri-forms of the methyl amines as set forth in claim 6 wherein super-atmospheric pressures of up to 20 atmospheres gauge are employed.

WILLIAM TYERMAN.

REFERENCES CITED

The following references are of record in the file of this patent:

UNITED STATES PATENTS

| Number | Name | Date |
|---|---|---|
| 2,045,929 | Swalley | June 30, 1936 |
| 2,125,905 | Fenske | Aug. 9, 1938 |
| 2,357,028 | Shiras et al. | Aug. 27, 1948 |

OTHER REFERENCES

Herold et al. 36 Chemical Abstracts 786.